March 16, 1954 V. RAWLS 2,672,179
APPARATUS FOR RELUGGING TIRES
Filed March 16, 1951 5 Sheets-Sheet 4
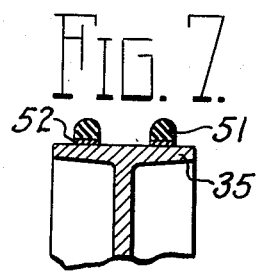
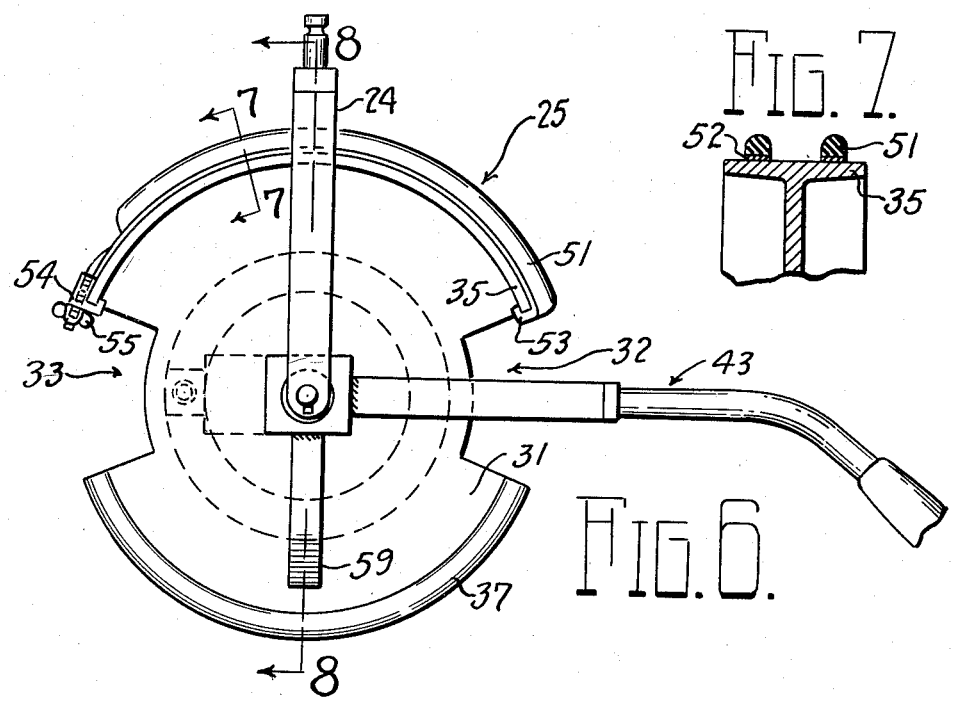
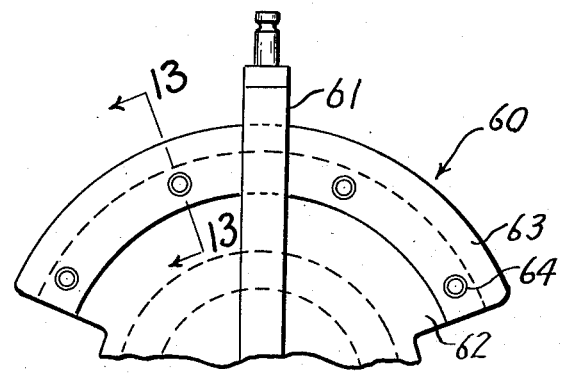
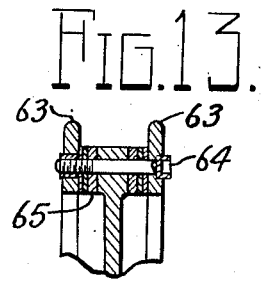
INVENTOR.
VAUGHN RAWLS
BY
Owen & Owen
ATTORNEYS March 16, 1954  V. RAWLS  2,672,179
APPARATUS FOR RELUGGING TIRES
Filed March 16, 1951  5 Sheets-Sheet 5

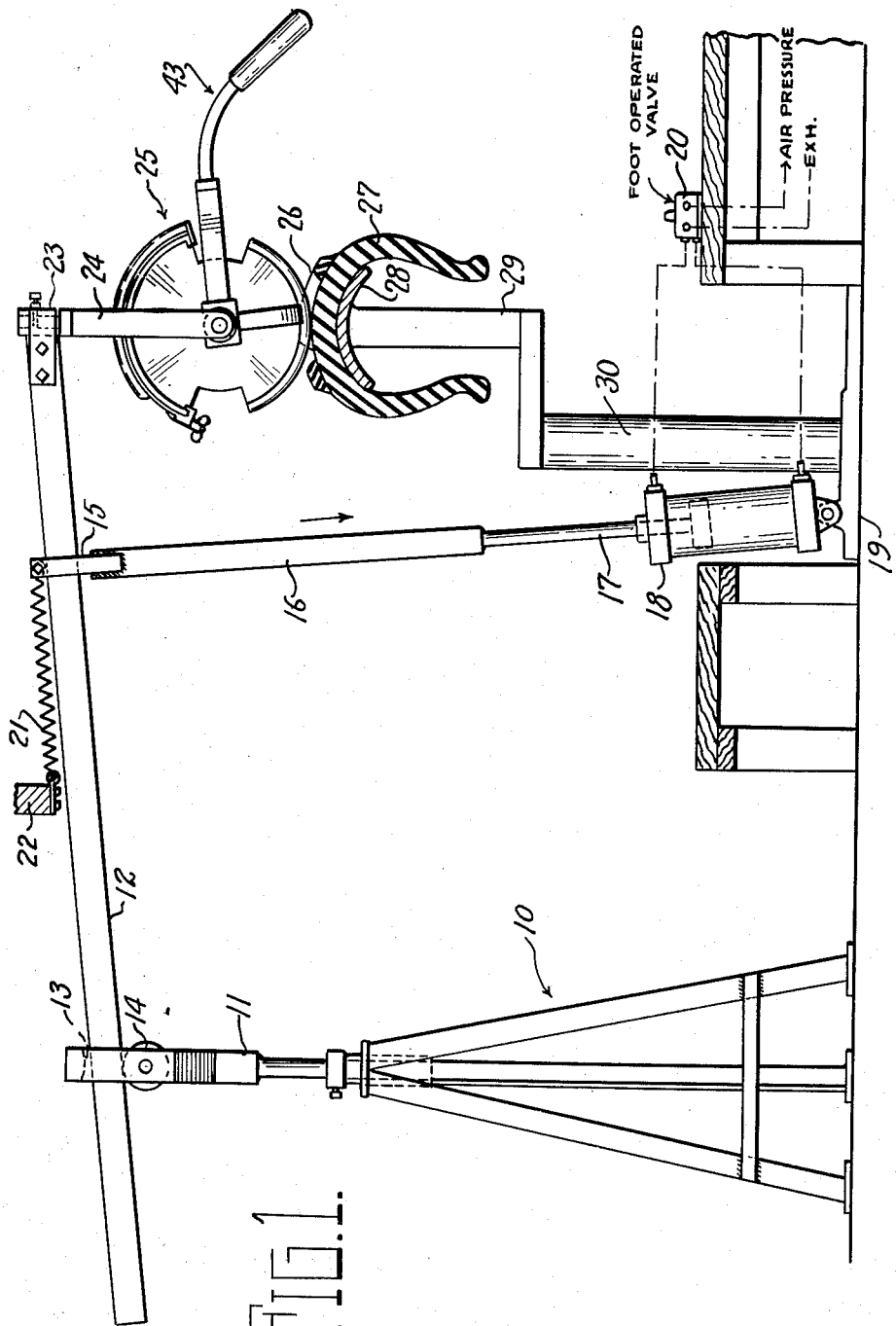

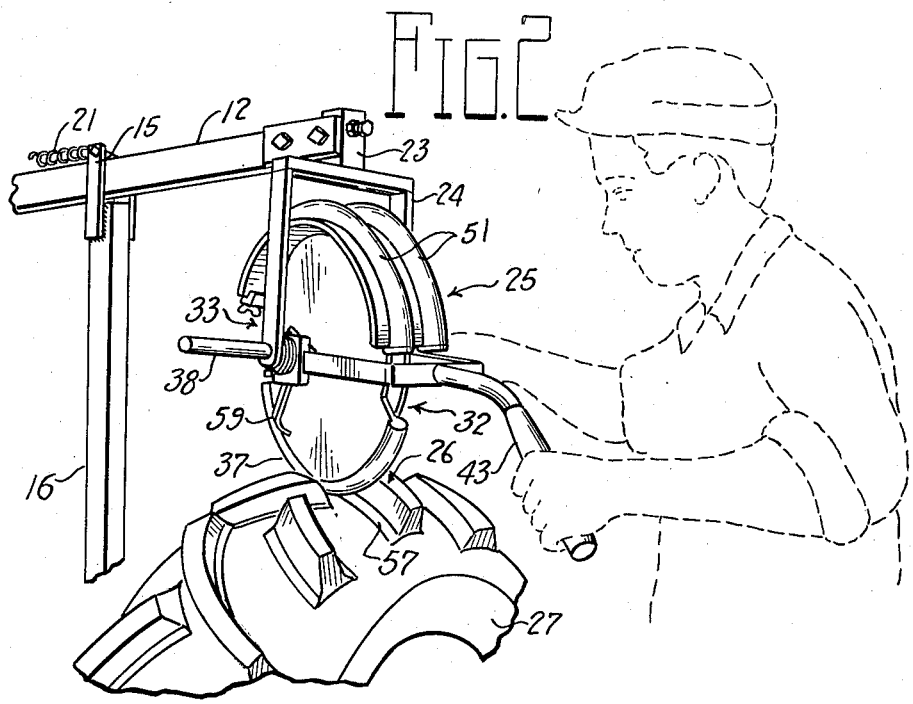
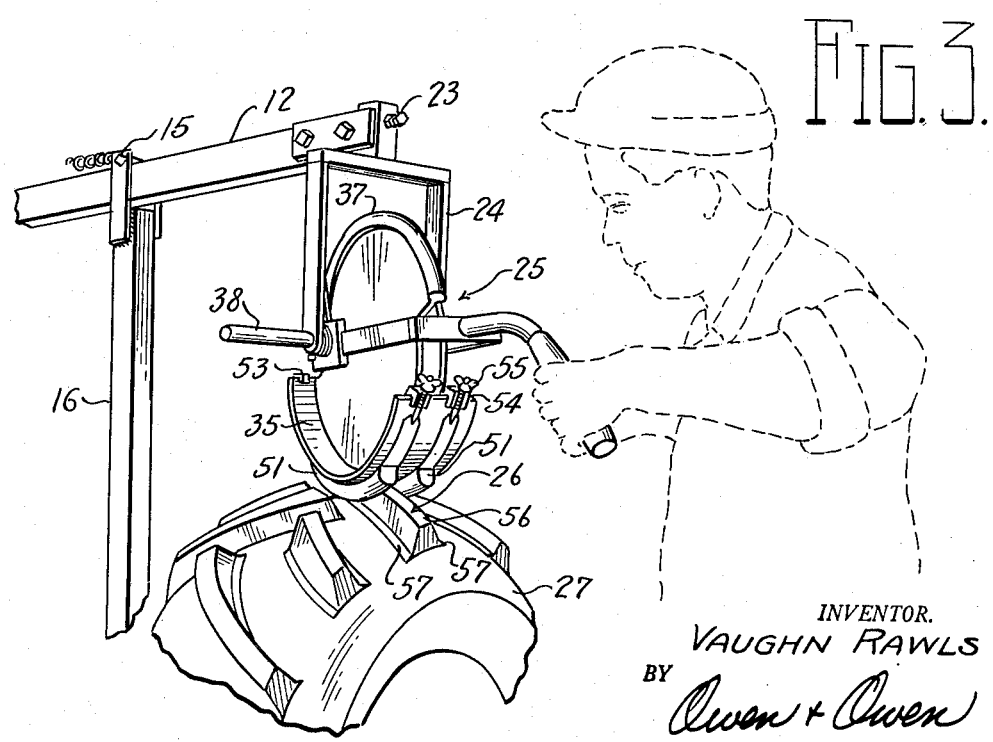

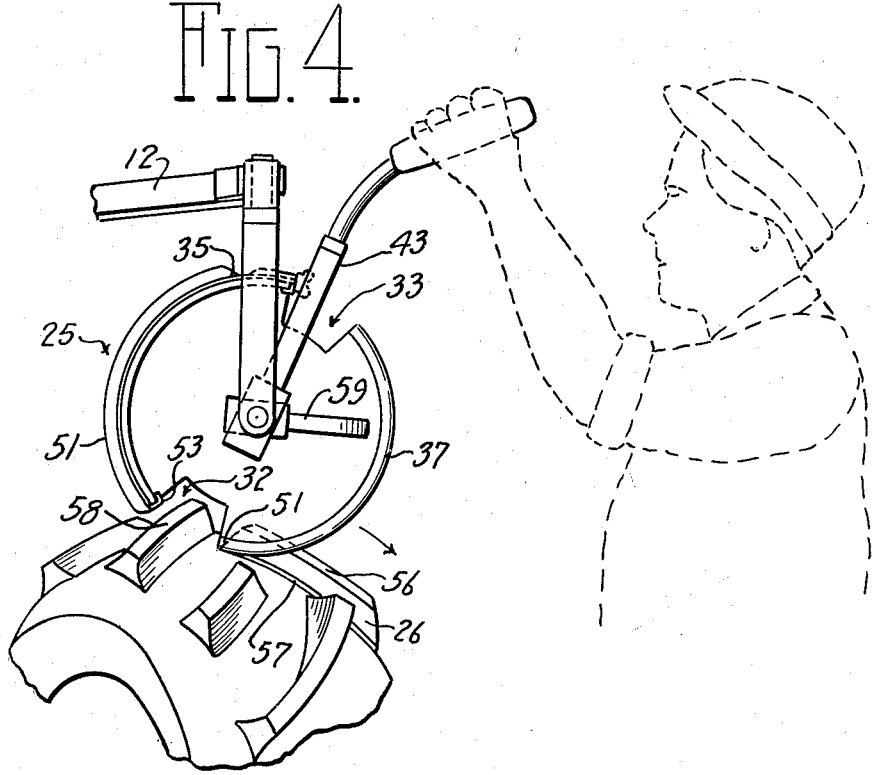
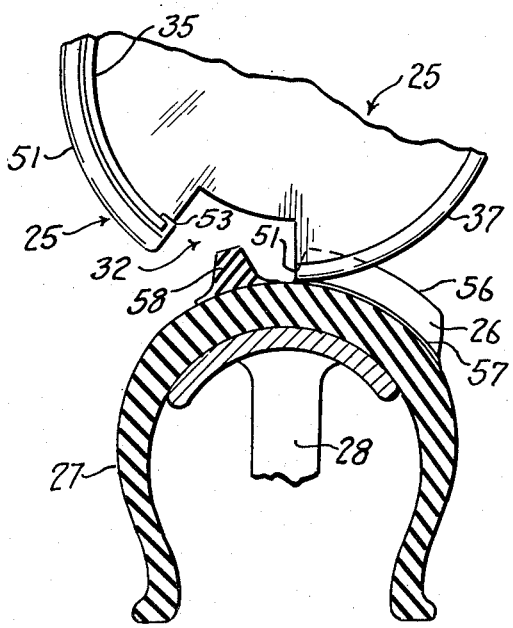

INVENTOR.
VAUGHN RAWLS
BY
Owen + Owen
ATTORNEYS

Patented Mar. 16, 1954

2,672,179

UNITED STATES PATENT OFFICE 2,672,179

APPARATUS FOR RELUGGING TIRES

Vaughn Rawls, Lima, Ohio, assignor to American Tire Machinery, Inc., Muncie, Ind., a corporation of California Application March 16, 1951, Serial No. 215,910

8 Claims. (Cl. 154—10)

This invention relates to the art of relugging heavy duty tires and to mechanism for emplacing lugs on tire carcasses and more particularly to improvements in an apparatus for stitching tire lugs to carcasses.

Heavy duty tires such as those used on tractors, earth movers and other vehicles with great weight and which must operate under adverse conditions are of large size and sometimes as much as eight or ten feet in diameter and are provided with heavy diagonally extending lugs on their perimeters. Most of the wear on the tires is experienced by the lugs themselves and, because of the cost of such tires, the trade has developed techniques of replacement of the lugs on used carcasses rather than the use of entirely new tires when an older tire becomes worn.

Tire lug stock consists in elongated pieces, of generally pyramidal cross section, molded from tough rubber. The tire lugs themselves are cut to the appropriate length and then adhered in some way to the periphery of the tire carcass. In my co-pending application, Serial No. 151,369 filed March 23, 1950, now U. S. Patent No. 2,611,411, I disclose an improved tire lug and method for relugging in which the lug stock has the generally conventional pyramidal cross section and also has transversely extending wings which also are adhered to the carcass. This lug and its method of adherence are improvements over the lug and method disclosed in my earlier Patent No. 2,474,013 which was issued June 21, 1949.

One of the principal difficulties encountered in such relugging operations is the problem of adhering or "stitching" the lugs to the tire carcasses. "Stitching" is the term used in the trade for the operation of forceably adhering the lug stock to the carcass. It is this phase of the relugging process to which the instant invention is directed.

It is the principal object of this invention to provide apparatus for forceably applying great pressure perpendicularly to the surface of a tire carcass and on portions of lug stock being adhered or "stitched" thereto.

It is another object of this invention to provide apparatus for changing the direction of force supplied progressively as the tire lug is adhered across the generally rhombus shaped external perimeter of the tire carcass.

These and more specific objects and advantages of the instant invention will be more fully understood by reference to the following specification and to the drawings in which:

Fig. 1 is a somewhat diagrammatic view in elevation of an apparatus embodying the instant invention for the stitching of tire lugs to a tire carcass;

Fig. 2 is a fragmentary perspective view showing one step of the stitching operation being performed on apparatus embodying the invention;

Fig. 3 is a view similar to Fig. 2 but of a different step in the method performed on apparatus embodying the invention;

Fig. 4 is a third perspective view showing the operation of the apparatus at a different point in the step of the method performed on the apparatus embodying the invention;

Fig. 5 is a fragmentary enlarged view in elevation illustrating in detail the step being performed in Fig. 4 and portions of the apparatus especially adapted for such step;

Fig. 6 is an enlarged view in elevation of one embodiment of the lug stitching member of apparatus embodying the invention;

Fig. 7 is a further enlarged, fragmentary, sectional view taken along the line 7—7 of Fig. 6;

Fig. 12 is a fragmentary view in elevation similar to Fig. 6 but of a second embodiment of the stitching mechanism; and Fig. 13 is a fragmentary sectional view taken on the line 13—13 of Fig. 12.

Figure 8:
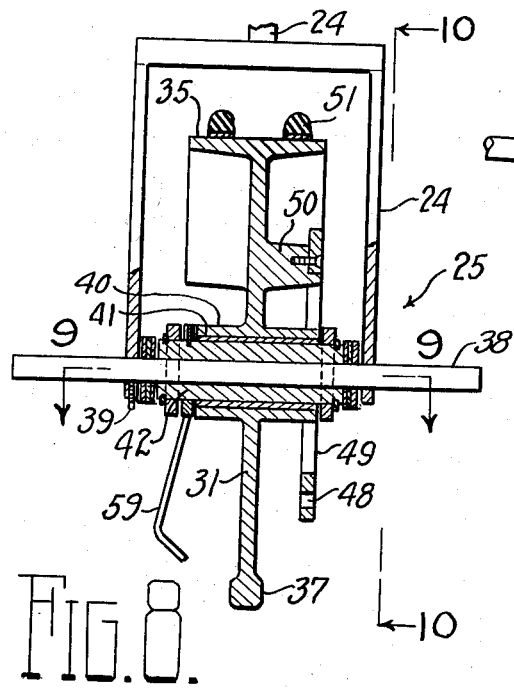
Fig. 8 is a vertical sectional view taken along the line 8—8 of Fig. 6.

An apparatus embodying the invention comprises, among other parts, a heavy pedestal generally indicated at 10 which supports a vertically adjustable upright 11 that in turn carries one end of a sliding beam 12. The beam 12 can be moved longitudinally through an opening 13 in the upper end of the upright 11 sliding on a roller 14 also mounted in the upright 11. The beam 12 also extends through a yoke 15 which is welded or otherwise secured on the upper end of a strut 16 the lower end of which is attached to a piston rod 17. The piston rod 17 extends into an air cylinder 18 which is pivotally secured to a floor plate 19. The air cylinder 18 communicates through a foot operated valve 20 with an air pressure line and an exhaust line. A spring 21 is connected between the upper end of the yoke 15 and a bracket 22 secured to the building frame, for example.

At the outermost end of the beam 12 there is mounted a fitting 23 which rotatably supports a downwardly extending fork 24. The fork 24 (see also Figs. 2 and 3) journals a rotatable stitching wheel generally indicated at 25.

The stitching wheel 25 is manually operated as shown in Figs. 2, 3 and 4 for the purpose of stitching individual tire lugs, for example the lug 26 on the surface of a heavy duty tire carcass 27 that is supported on a mandrel 28 (Fig. 1) that in turn is mounted on the upper end of a sturdy arm 29 that is carried by a post 30.

The stitching wheel 25 (see Figs. 6–11) has a generally circular flange 31 that is cut away to form diametrically opposed openings 32 and 33 and thus has two segmental sections. One of the segmental sections 34 is provided with an axially extending annular rim 35 (see Figs. 3 and 8), while the other segmental section 36 has a beaded rim 37.

The stitching wheel 25 is rotatably mounted in the fork 24 by means of a rod-like axle 38 which extends through the ends of the arms of the fork 24 and is held against rotation therein by a set screw 39 (Fig. 8). The wheel 25 has a tubular hub 40 that is journalled on a sleeve bearing 41. The sleeve bearing 41 is carried by a generally tubular bushing 42 which is eccentrically bored and which rotates on the axle 38.

Figure 9:
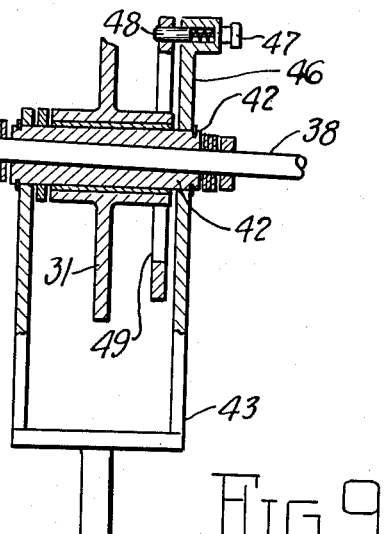
Fig. 9 is a horizontal fragmentary sectional view taken along the line 9—9 of Fig. 8.
Figure 11:
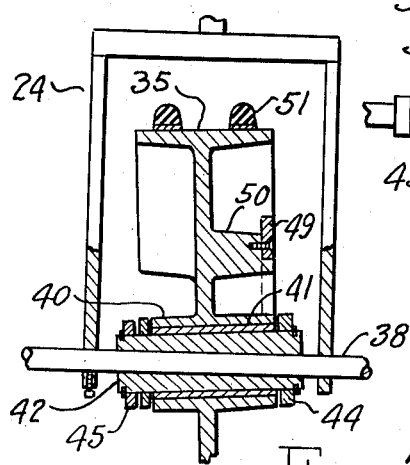
Fig. 11 is a fragmentary vertical sectional view similar to Fig. 9 but showing how the relative positions of portions of the mechanism illustrated in Figs. 8 through 10 can be varied.

The eccentric bore of the bushing 42 can best be seen by comparing Figs. 8, 9 and 11 which illustrate the maximum eccentricity of the bore and how the wheel is canted when the bushing 42 is turned on the axle 38.

Figure 10:
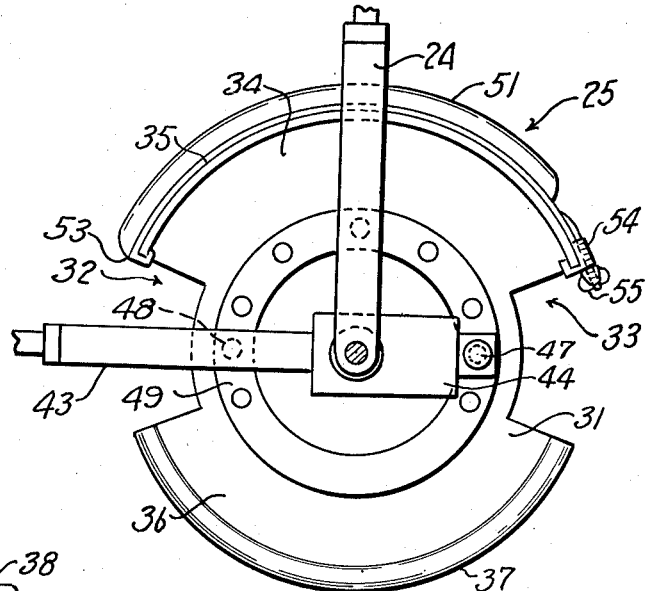
Fig. 10 is a fragmentary view in elevation taken along the line 10—10 of Fig. 8.

The wheel is rotated by means of a bifurcated handle 43 which is fixed to a pair of handle plates 44 and 45 (Figs. 10 and 11). The handle plate 44 has a radially extending arm 46 through the end of which extends a spring pressed detent 47 that is engageable in either of a pair of diametrically opposed holes 48 (Fig. 8) that are formed in a positioning ring 49 which is bolted to bosses 50 formed on the flange 31 of the stitching wheel 25.

As can be seen by a comparison between Figs. 2 and 3 the stitching wheel is adapted to be used with either of its segmental sections 34 or 36 turned downwardly. Shifting between the two positions shown in Figs. 2 and 3 is accomplished by disengaging the spring pressed detent 47 from that one of the holes 48 in which it is engaged and then rotating the wheel 25 on the bearing 41 through 180° to engage the detent 47 in the other one of the holes 48. The operator may thus select at will that one of the two segmental sections of the stitching wheel 25 which is to be employed in operating on a tire lug being stitched.

The cylindrical rim 35 (see Figs. 6, 7 and 12, 13) is employed for the purpose of initially stitching a lug on the prepared surface of a tire carcass as shown in Fig. 3. Parallel annular pressing beads 51 are removably mounted for axially adjustable positioning on the rim 35. In the embodiment illustrated in Figs. 6, 7 and shown in use in Fig. 3, each of the beads 51 consists in a strap 52 which has a hook 53 at one end that is engaged over the end of the rim 35 and a second hook 54 at its other end which can be tightened by thumb screw 55 to catch the opposite end of the rim 35.

Thus, by loosening the thumb screw 55 the beads 51 may be adjusted along the rim 35 to space them axially from each other a distance such that they closely embrace a tire lug being stitched as shown in Fig. 3. The cylindrical surface of the rim 35 and the inner sides of the beads 51 form a generally U-shaped channel which exerts pressure downwardly on the outermost, generally flat surface 56 of a lug being stitched and also upon its laterally extending wings 57 simultaneously to press the entire bottom surface of the lug 26 against the carcass 27.

The opposite side of the stitching wheel 25 having the segmental section 36 and provided with the beaded rim 37, is employed for exerting pressure individually on each of the wings 57 of a lug 26 as is shown in Fig. 2. After the operator has initially stitched a lug as shown in Fig. 3, he can rotate the stitching wheel 25 with respect to the handle 43 as has been explained and apply individual pressure to each of the wings 57 by the use of the beaded rim 37 as is illustrated in Fig. 2.

The application of pressure to the lugs being stitched in place, whether in the first operation of Fig. 3 or the second operation of Fig. 2, is accomplished in a manner now to be described. After the tire carcass 27 has been placed on the mandrel 28 (Fig. 1), a tire lug 26 is cut to a length appropriate for its particular position on the tire carcass 27 and is laid thereon. The operator then rotates the stitching wheel 25 on its vertical axis (in the fitting 23) until he has lined up the plane of its flange 31 with the longitudinal center line of the lug to be stitched. He then rotates the wheel 25 with respect to the handle 43 until the edge of the rim 35 is placed at the beginning of the lug to be stitched.

In Figs. 4 and 5, the beaded rim 37 is shown in position to start the stitching of a wing 57. The opening 32 is shown as spanning a transversely extending lug 58 in order to let the end of the beaded rim 37 come close to the lug 58 at the beginning of the lug 26 to be stitched. If it were not for the opening 32, or, in the case of the cylindrical rim 35, the opening 33, the adjacent transverse lug 58 would be cut by the other rim. The cylindrical rim 35 is similarly placed at the beginning of the stitching operation when the lug body is first stitched into place.

After the operator has thus positioned and thus engaged the stitching wheel 25 with the emplaced lug 26, which positioning of course, includes the sliding of the beam 12 outwardly until the stitching wheel 25 is vertically centered over the beginning of the tire lug 26 being stitched, he operates the foot valve 20 admitting air under pressure into the upper end of the cylinder 18. This pulls downwardly on the strut 16 and through the medium of the yoke 15, exerts force downwardly on the stitching wheel 25 thrusting its flange against the upper surface 56 of the lug 26. At this point in the operation the handle 43 is swung upwardly almost to vertical. The operator then pulls downwardly rotating the wheel 25 in a clockwise direction (Figs. 1, 4 and 5) and rolling it along the surface of the lug 26 thus tightly pressing the lug 26 against the tire carcass and "stitching" the lug and its wings 57 to the carcass.

After this initial stitching the operator releases the foot valve, allowing the air to escape from the cylinder 18 and then, with the pressure relieved, he rotates the stitching wheel 25 relative to the handle 43 to bring the beaded rim 37 into operating position. He then engages the beginning edge of the beaded rim 37 with the beginning end of the tire lug to be stitched, placing the rim 37 at one of the sides of the lug 26 where it will press on the corresponding wing 57 of that lug and with the opening 33 spanning the adjacent transversely extending lug 58. He again admits air into the cylinder 18 and rotates the stitching wheel to apply pressure to the wing 57 being stitched. After one of the wings 57 is thus tightly stitched, the steps are repeated and the other wing is stitched. After these operations the lug 26 is stitched into place. The operator then relieves the pressure, moves the tire carcass on the mandrel 28 and emplaces a subsequent lug to be stitched and repeats the process of lining up the stitching wheel and stitching each subsequent lug onto the tire carcass 27.

As has been mentioned, the stitching wheel 25 is journalled for rotation upon the bushing 42 which is eccentrically bored. The purpose of the eccentricity of the bore in the bushing 42 is to compensate for the fact that as an individual tire lug 26 progresses diagonally across and around the surface of a tire carcass, the plane of its upper flat surface 56 gradually tilts over, being generally parallel at any particular point to the circular surface of the tire itself. Particularly, therefore, with respect to the preliminary stitching accomplished by the cylindrical rim 35, it is preferable to tilt the stitching wheel in a compensatory manner.

I have developed the fact that if the bore in the bushing 42 is eccentric by approximately 5°, the stitching wheel will be tilted when rotated at approximately the correct rate to compensate for this canting over of the flat upper surface of a tire lug. The degree to which the wheel should be tilted depends, of course, upon the diameter of the tire being relugged, upon the diameter of the tire body at the point of lugging, upon the length of the particular lug being stitched and upon its position on the tire. Experiments will reveal to an operator the degree of canting which is required for any particular tire and tire lug and once the cant is established tire lugs of that size can all be stitched with the stitching wheel at the same setting.

The canting or tilting of the stitching wheel 25 is accomplished by a rotating handle 59 (Figs. 2, 6 and 8) which is secured directly to the bushing 42 (Fig. 8). By rotating the handle 59, the bushing 42 is rotated relative to the fork 24 and also relative to the wheel 25 and handle 43. Thus the eccentricity of the axle 38 with respect to the stitching wheel 25 can be changed through the positions shown in Figs. 8, 9, 10 and 11 correspondingly tilting the stitching wheel and providing for its progressive canting over during the approximate 180° rotation necessary to stitch a lug.

This progressive tilt of the stitching wheel 25 is particularly important when the cylindrical rim 35 and the two adjustable beads 51 are engaged with the lug in the first stitching operation. As has been mentioned, the beads 51 on their strips 52 can be adjusted axially of the stitching wheel to vary their spacing for properly embracing a lug to be stitched.

Figs. 12 and 13 illustrate a modification of the structure for axially adjusting the stitching mechanism. In these figures a stitching wheel 60 is shown fragmentarily as being carried by a fork 61. The mechanism for mounting the stitching wheel 60 in the fork 61 and for mounting the fork 61 may be identical to that already described with respect to the stitching wheel 25. The stitching wheel 60, like the stitching wheel 25, has a segmental section 62 corresponding to the section 34 and which carries a pair of stitching beads 63. The stitching beads 63 in this case are semi-annular, flat members which are bolted to the flange of the wheel 60 by means of several bolts 64 and which are spaced from each other through the use of graduated shims or spacers 65 that are also held on the wheel 60 by the bolts 64. Although not shown in Figs. 12 and 13, the wheel 60 is also provided with a second segmental section and beaded rim similar to the beaded rim 37 of the stitching wheel 25. Other than the difference in means for mounting and spacing the two stitching beads 63, the structure of the stitching wheel 60 of Figs. 12 and 13 and its function and use are identical with those earlier disclosed.

I claim:

1. Apparatus for relugging tires by stitching lugs to carcasses comprising, in combination, a rotary stitching wheel, means for rotatably mounting said wheel, means for supporting a tire carcass in operating position near said wheel, means for urging the periphery of said wheel against a lug being stitched on the tire carcass, means for rolling said wheel along the lug and in contact therewith, said wheel having an arcuate peripheral working surface at least as long as the longest lug to be stitched and means for progressively canting the axis of said wheel angularly to a plane of the axis of the tire as it is rolled along the lug.

2. Apparatus for relugging tires by stitching lugs to carcasses comprising, in combination, a rotary stitching wheel, means for rotatably mounting said wheel, means for supporting a tire carcass in operating position near said wheel, means for urging the periphery of said wheel against a lug being stitched on the tire carcass, means for rolling said wheel along the lug and in contact therewith, said wheel having an arcuate cylindrical surface for pressing the body of the lug against the carcass and an arcuate beaded surface for pressing the wings of the lug against the carcass, and means for selectively positioning said surfaces for contact with the lug.

3. Apparatus for relugging tires by stitching lugs to carcasses comprising, in combination, a rotary stitching wheel, means for rotatably mounting said wheel, means for supporting a tire carcass in operating position near said wheel, means for urging the periphery of said wheel against a lug being stitched on the tire carcass, means for rolling said wheel along the lug and in contact therewith, said wheel having an arcuate cylindrical surface for pressing the body of the lug against the carcass and an arcuate beaded surface for pressing the wings of the lug against the carcass, means for selectively positioning said surfaces for contact with the lug and means for progressively canting said wheel as it is rotated.

4. Apparatus for relugging tires comprising, in combination, a frame, an arm mounted for horizontal and vertical movement relative to said frame, means for urging said arm downwardly, a circular rotary stitching wheel, means for rotatably mounting said stitching wheel at the end of said arm, said wheel having an arcuate cylindrical rim extending less than 180° and an opposed arcuate rim also extending less than 180°, there being a radially extending notch in said wheel between each of the adjacent ends of said rims, means for supporting a tire carcass beneath said wheel, manual means for rotating said wheel, adjustable means for alternatively positioning one of said rims in position to engage a lug to be stitched and means for progressively canting said wheel as it is manually rotated.

5. Apparatus according to claim 3 in which said arcuate cylindrical surface is provided with adjustable radially extending parallel ridges adjustable axially for varying the distance therebetween, said ridges and said cylindrical surface acting to embrace a lug to be stitched.

6. Apparatus according to claim 3 in which the means for progressively canting said wheel consists in a cylindrical bushing on which said wheel is rotatably mounted, said bushing having an eccentric bore and being rotated with said wheel when stitching a lug.

7. Apparatus according to claim 3 in which the means for progressively canting said wheel consists in a cylindrical bushing on which said wheel is rotatably mounted for rotation for selectively positioning said surfaces for contact with the lug, said bushing having an eccentric bore and being rotatable on a fixed axle with said wheel during stitching of a lug, the relative positions of said wheel and said cylindrical bushing being adjustable to vary the degree of canting of said wheel.

8. Apparatus for relugging tires by stitching individual lugs diagonally on the exterior of tire carcasses comprising, in combination, a rotary stitching wheel having opposite arcuate operating surfaces, each of said surfaces extending circumferentially less than 180°, there being notches between adjacent ends of said surfaces deeper and circumferentially longer than the transverse section of a lug to be stitched, one of said operating surfaces having a cylindrical periphery and a pair of axially adjustable radially extending beads adjustably positionable relative to said cylindrical surface and the other of said operating surfaces consisting in a bead-like rim, a cylindrical bushing on which said wheel is rotatably mounted, means for locking said wheel relative to said bushing to alternatively present one of said operating surfaces in position to operate upon a lug, said bushing having an angularly directed bore, an axle extending through said bore, means for supporting said axle in position with said wheel in contact with a lug to be stitched, means for supporting a tire carcass beneath said wheel, means for urging said wheel downwardly against a lug to be stitched and means for rotating said bushing relative to said wheel for varying the angularity of said wheel relative to said axle and controlling the canting of said wheel when rotated.

VAUGHN RAWLS.

References Cited in the file of this patent

UNITED STATES PATENTS

| Number | Name | Date |
|---|---|---|
| 1,768,341 | Stevens | June 24, 1930 |
| 2,406,093 | Miller | Aug. 20, 1946 |
| 2,498,953 | Glynn | Feb. 28, 1950 |
| 2,556,264 | Flynn | June 12, 1951 |